June 25, 1929.　　　　J. P. MACKIE　　　　1,718,423
DOFFING MOTION FOR SPINNING, TWISTING, AND LIKE MACHINES
Filed April 30, 1927　　　6 Sheets-Sheet 1

INVENTOR
John Pringle Mackie
BY
Gill + Jennings
ATTORNEYS

June 25, 1929.  J. P. MACKIE  1,718,423
DOFFING MOTION FOR SPINNING, TWISTING, AND LIKE MACHINES
Filed April 30, 1927  6 Sheets-Sheet 2
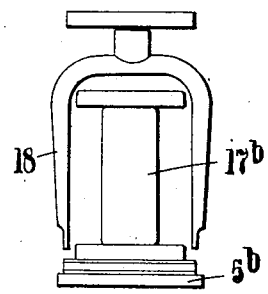
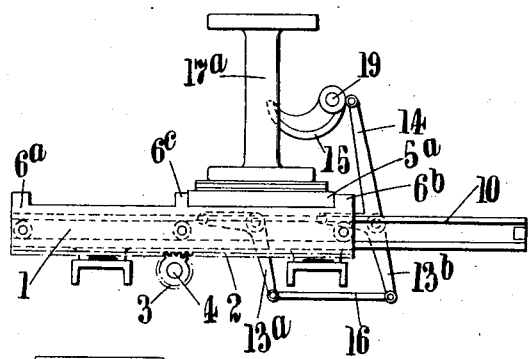
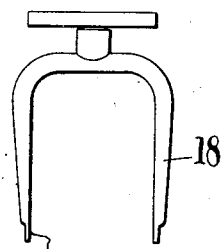
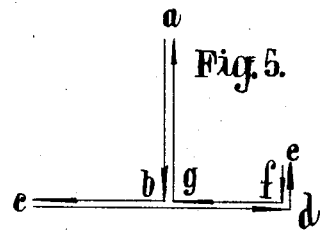
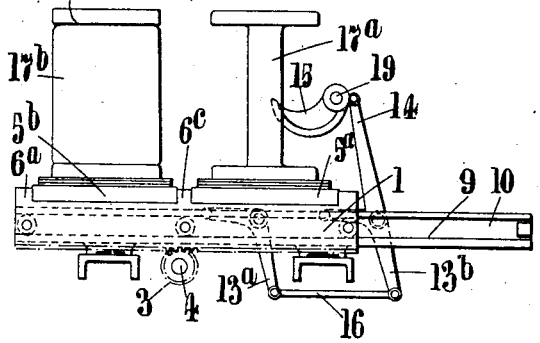
INVENTOR
John Pringle Mackie
BY
Gill + Jennings
ATTORNEYS.

June 25, 1929.  J. P. MACKIE  1,718,423
DOFFING MOTION FOR SPINNING, TWISTING, AND LIKE MACHINES
Filed April 30, 1927   6 Sheets-Sheet 3
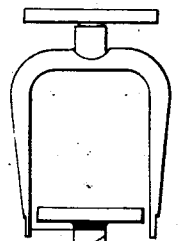
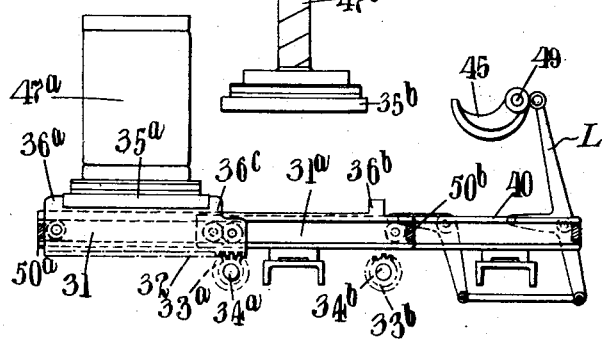
Fig.6.
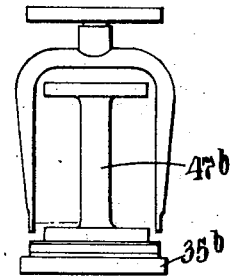
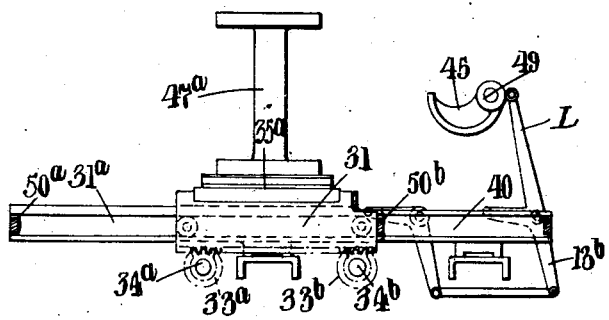
Fig.7.
INVENTOR
John Pringle Mackie
BY
ATTORNEYS June 25, 1929. J. P. MACKIE 1,718,423
DOFFING MOTION FOR SPINNING, TWISTING, AND LIKE MACHINES
Filed April 30, 1927 6 Sheets-Sheet 4

INVENTOR
John Pringle Mackie
BY
Gill & Jennings
ATTORNEYS.

June 25, 1929.  J. P. MACKIE  1,718,423
DOFFING MOTION FOR SPINNING, TWISTING, AND LIKE MACHINES
Filed April 30, 1927  6 Sheets-Sheet 5
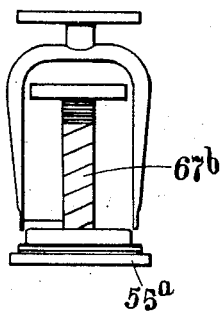
Fig.11.
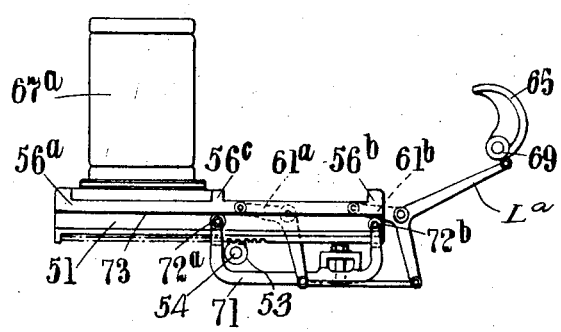
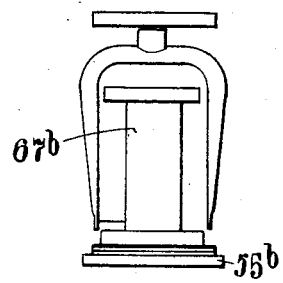
Fig.12.
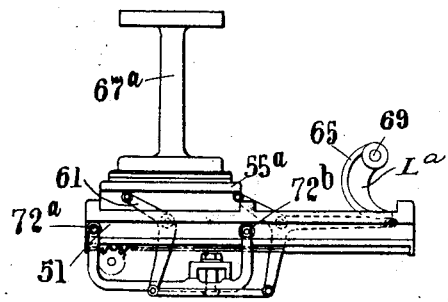
INVENTOR
John Pringle Mackie
BY
Gill & Jennings
ATTORNEYS.

June 25, 1929.   J. P. MACKIE   1,718,423
DOFFING MOTION FOR SPINNING, TWISTING, AND LIKE MACHINES
Filed April 30, 1927   6 Sheets-Sheet 6
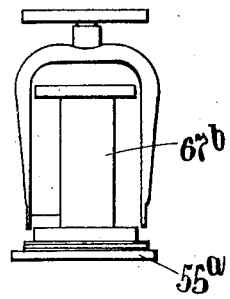
Fig.13.
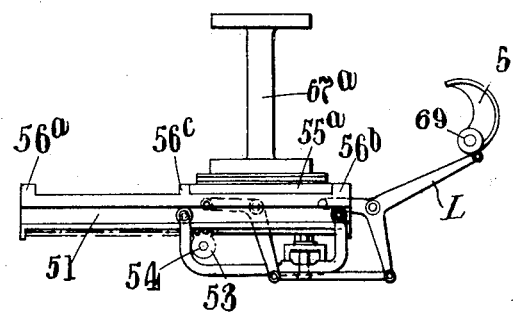
Fig.15.
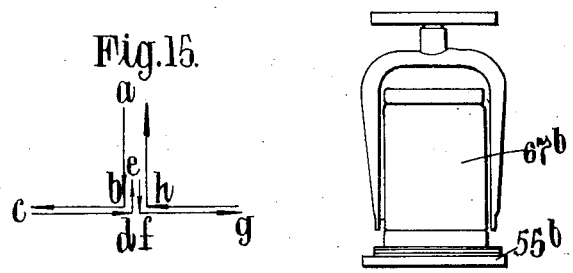
Fig.14.
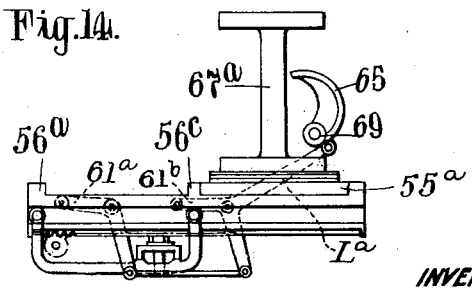
INVENTOR
John Pringle Mackie
BY Gill + Jennings
ATTORNEYS.

Patented June 25, 1929.

1,718,423

UNITED STATES PATENT OFFICE.

JOHN PRINGLE MACKIE, OF BELFAST, IRELAND, ASSIGNOR TO JAMES MACKIE AND SONS, LIMITED, OF BELFAST, IRELAND, A BRITISH COMPANY.

DOFFING MOTION FOR SPINNING, TWISTING, AND LIKE MACHINES.

Application filed April 30, 1927, Serial No. 187,946, and in Great Britain August 30, 1926.

This invention relates to doffing motions for spinning, twisting and like machines, and in particular it is concerned with machines of the class in which rows of spindles are provided on separate interchangeable bobbin rails, and the rails are adapted to be moved both in vertical and horizontal directions so as to bring empty bobbins successively into the spinning position within the flyers and to bring the rails carrying bobbins which have been filled into the doffing position The principal objects of the present invention are to improve the mechanism for effecting the exchange of the bobbin rails while facilitating the doffing and to minimize wear in the parts, and at the same time to arrange the mechanism in such a way that it need not project to the front of the line of flyers when in operation so that it does not impede the operators when attending to the frames In spinning frames in which the interchangeable bobbin rails are carried upon a horizontally traversible carriage it is necessary to move the rail carrying the empty bobbins from a forward position to a rearward position on the carriage to make a space in the forward position to receive the rail carrying the bobbins which have just been filled. If this movement is effected by using the builder mechanism for lifting the rail with empty bobbins and then lowering the same into the rear position, not only has a separate support to be provided for the rail of filled bobbins during this operation, but the movement of the empty bobbins is somewhat complicated and the operation has to be performed while the machine is not running. This change in position of the rail carrying the empty bobbins has been simplified by pushing this rail rearwardly on a horizontal slide-way, but the present invention avoids the friction and consequent wear on the bobbin rails and co-operating parts due to this slide-way.

According to the present invention, during the time when the rail carrying the empty bobbins is moved to the rearward position on the carriage, a lifting mechanism is employed independently of the builder mechanism, so that the nuisance of lowering the builder mechanism from the rail carrying the filled bobbins is obviated. It is preferred to arrange the separate lifting mechanism to be operated by the attendant independently of the traversing movement of the carriage. The lifting of the rail carrying the empty bobbins may be effected when that rail has been moved to the rear of the spinning position, but unless arrangements are made to avoid excessive rearward projection of the carriage and its slides, some inconvenience may arise due to this cause. However, in accordance with the invention this inconvenience can be avoided by making the carriage consist of two telescoping parts, that is to say parts with lost motion, the carriage proper sliding on an intermediate carriage which in its turn moves on the fixed slide. Then, when the empty bobbins are carried to the rear position, the parts can so telescope that there is no need for the fixed slide to project beyond the rear position. The same inconvenience can easily be avoided, however, by causing the lifting mechanism to lift the rail with the empty bobbins when the latter are below the spinning position and not to the rear of the spinning position, but this of necessity requires a little more head room to enable the empty bobbins to pass below those in the spinning position and to be slightly lifted while below the bobbins in the spinning position. A convenient form of lifting mechanism comprises pivoted lifting arms which may be operated by a pivoted frame or linkwork which may be rocked upon the rotation of a cam carried on a spindle which can be turned by the operator.

In order that the invention may be clearly understood and readily carried into effect, some examples of doffing motions constructed in accordance with the present invention will now be described more fully with reference to the accompanying drawings, in which:—

Figures 2, 3 and 4 are similar views showing successive positions of the parts;

Figure 5 is a diagram illustrating the cycle of movements carried out by the mechanism shown in Figures 1 to 4;

Figure 6 is a view similar to Figure 1 showing a modified doffing motion having the carriage formed in two telescoping parts;

Figures 7, 8, 9 and 10 are similar views showing the parts in successive positions;

Figure 11 is a view corresponding to Figure 1 showing yet a further modified form of doffing motion arranged for the independent lifting motion to be applied to the rail of bobbins immediately below the spinning position;

Figures 12, 13 and 14 are corresponding figures showing the parts in successive positions; and Figure 15 is a diagram showing the cycle of movements carried out by the motion shown in Figures 11 to 14.

Figure 1:
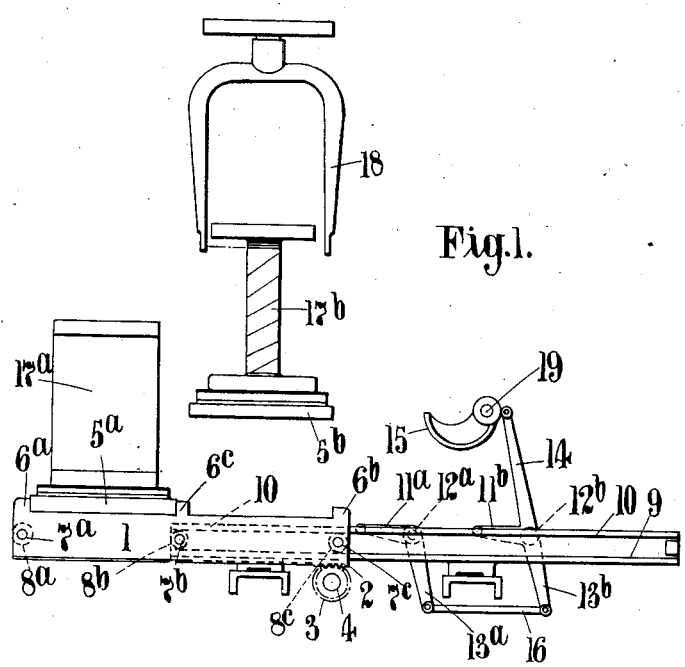
Figure 1 is a diagrammatic side view showing the parts of the mechanism used for moving the interchangeable rails with their bobbins from the spinning to the doffing positions, and vice versa.

Referring first of all to Figures 1 to 5 of the drawings, a simple form of doffing motion is illustrated in which the carriage is a simple carriage 1 cut with rack teeth 2 on its under surface. The teeth 2 are engaged by a pinion 3 on the operating shaft 4 on the end of which is secured a handle not shown by means of which the operator carries out the transferring motion from the spinning position to the doffing position. As can be seen from the drawings, the carriage 1 is of sufficient width from back to front to accommodate two bobbin rails indicated at $5^a$ and $5^b$. These may be received in two recesses which are formed by forward and rearward ledges $6^a$, $6^b$ and an intermediate ledge or ride $6^c$ extending along the carriage across the machine and leaving recesses just wide enough to accommodate the one bobbin rail. In Figure 1, for example, the bobbin rail $5^a$ is shown seated in the forward recess between the ridges $6^a$ and $6^c$. As illustrated, the carriage 1 has three pins $7^a$, $7^b$ and $7^c$ projecting from each side, each carrying a friction roller $8^a$, $8^b$ and $8^c$ adapted to engage within a groove 9 in a fixed slide 10. The slide may extend slightly to the front of the spinning position only so that when the carriage is moved forward to the doffing position as shown in Figure 1, approximately the forward half of the carriage 1 overhangs the fixed slide 10.

The lifting mechanism comprises brackets 113 guided on the standards 114 of the machine in its rising and falling movements. The brackets 113 are given an up-and-down motion for effecting the building operation, this motion being transmitted to it through the chain 115 and sprocket wheel 116, which may have any usual connection to the building cam.

Figure 2:
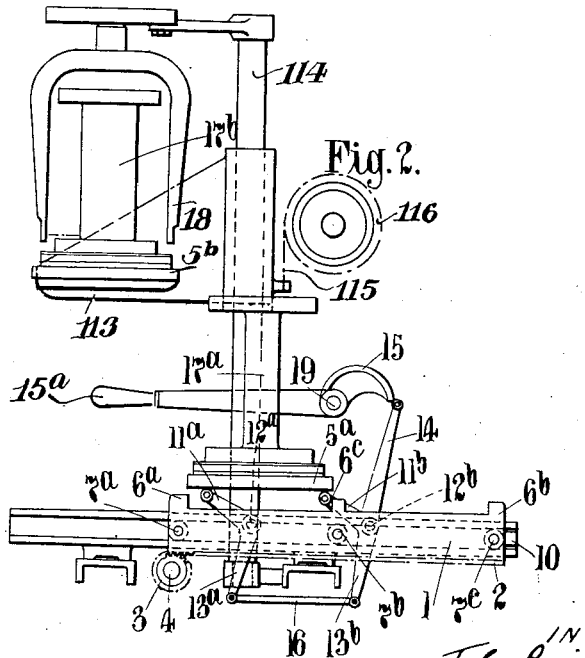
Figure 8:
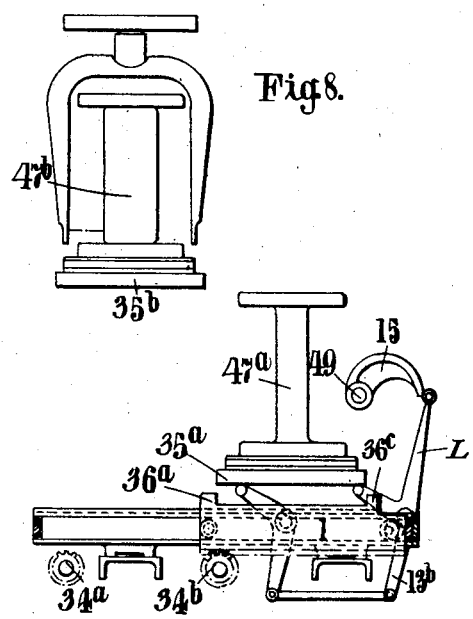
Figure 10:
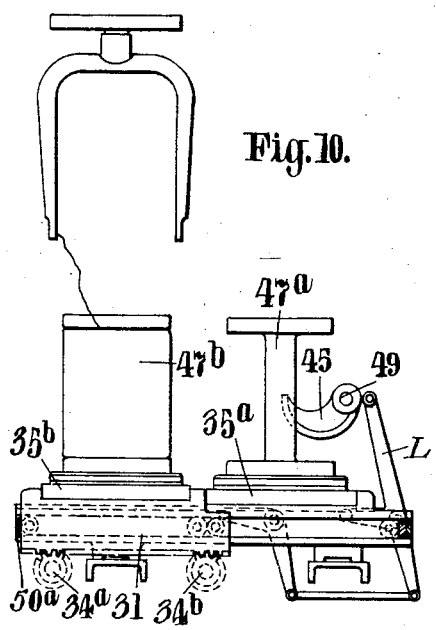
Figure 9:
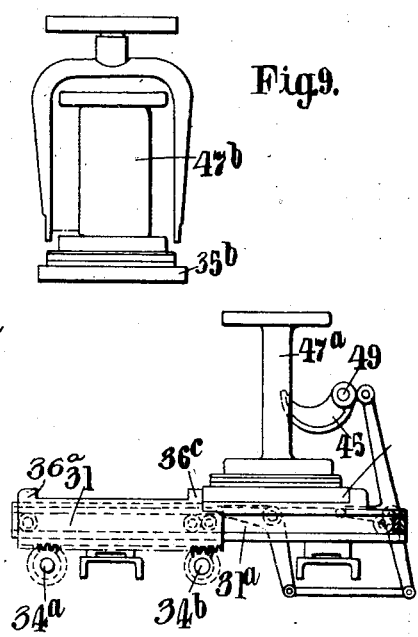

The independent lifting motion in the form illustrated comprises a pair of arms $11^a$, $11^b$ pivoted to the frame 10 at $12^a$ and $12^b$ and having their free ends extending so as to be just below the bobbin rail when the latter is moved rearwardly over the arms $11^a$, $11^b$. The arm $11^a$ is one arm of a bell crank lever whose other arm $13^a$ extends downwards. The arm $11^b$ is also the arm of a similar bell crank lever with a downwardly extending arm $13^b$ but also provided with an additional long arm 14 projecting upwards into the path of a snail cam 15. The downwardly projecting arms $13^a$, $13^b$ are linked together by a rod 16 so that when by the operator turning the hand lever $15^a$ the snail cam 15 is turned to push the free end of the long arm 14 rearwardly as shown in Figure 2, the frame constituted by the two bell crank levers is rocked so that the free ends of the arms $11^a$, $11^b$ rise into the position shown in Figure 2 and lift the bobbin rail $5^a$ which has been moved to the position above these arms sufficiently high for the carriage 1 to be free of the ridges $6^a$, $6^b$ and $6^c$.

The transferring movements and the doffing are carried out in the following cycle of operations: Commencing from the position shown in Figure 1, in which spinning is going on upon the bobbins $17^b$ which are between the flyers 18 in the spinning position, and in which the other set of bobbins $17^a$ are filled and are on the rail $5^a$ in the doffing position. The operator first changes the filled bobbins $17^a$ for empty bobbins and then, at a moment when the bobbins $17^b$ in the spinning position are at the top of their travel, the operator by turning the handle on the shaft 4 racks the carriage 1 completely across into the rear position shown in Figure 2 and the bobbin rail $5^a$ is then above the arms $11^a$, $11^b$. Then the operator turns the cam 15 by turning an independent handle on the end of its shaft 19. This raises the rail $5^a$ into the position shown in Figure 2 so that its lower surface is above the top of the ridges $6^a$, $6^b$ and $6^c$. Then, by again turning the shaft 4 in the opposite direction, the carriage 1 is racked forward until the forward recess between the ridges $6^a$ and $6^c$ is immediately below the spinning position, whereupon by rotating the shaft 19 and the cam 15, the bobbins $17^a$ upon the rail $5^a$ are lowered into the rearward recess between the ridges $6^b$ and $6^c$. When the bobbins $17^b$ in the spinning position are full, the rail $5^b$ bearing the full bobbins is lowered into the forward recess between the ridges $6^a$ and $6^c$. The parts have then taken up the position shown in Figure 4. It is obvious, however, that if desired the bobbins $17^b$ can be lowered into the forward recess before the bobbins $17^a$ have been lowered into the rearward recess. Next the carriage 1 carrying both the empty and full bobbins is moved to the forward position again as shown in Figure 1; the builder motion is caused to lift the empty bobbins $17^a$ into the spinning position within the flyers 18, and the full bobbins $17^b$ are then ready for doffing. The cycle has been completed, the parts are again in the position shown in Figure 1 except, of course, that the empty and filled bobbins have been interchanged.

The cycle is diagrammatically illustrated in Figure 5 where $a$ represents the spinning position, the movement from $a$ to $b$ the descent of the filled bobbins, the movement from $b$ to $c$ the forward motion into the doffing position where the filled bobbins are changed for empty bobbins, then the movement of the empty bobbins to the rear position is shown by the arrow $c, d$, the independent lift by the arrow $d, e$, the descent by the arrow $e, f$, the movement to the position below the spinning position by $f, g$, and the lift into the spinning position by the arrow $g, h$.

It will be realized, of course, that the first portion of the above operation can be carried out immediately after the frame has been doffed, that is to say, as soon as the filled bobbins 17$^a$ (see Figure 1) have been replaced by empty bobbins, and at a suitable moment when the bobbins 17$^b$ in the spinning position are at the top of their travel, the carriage 1 bearing the empty bobbins 17$^a$ can be racked across to the rearward position thus withdrawing all the operating mechanism to the inside of the framework so that nothing projects beyond the forward end of the slide-way 10. This has the advantage that the front of the frame is left entirely free from projecting parts so that the operator can attend to the spinning operation without hindrance. This improvement is common to all three forms of doffing motions which are illustrated in the drawings.

In the form of doffing motion illustrated in Figures 6 to 10 there is less projection of the slide to the rear. In this form the simple carriage 1 shown in Figures 1 to 4 is replaced by a double carriage in which the carriage proper has a ridge 36$^a$ and 36$^c$ both at the forward end and the rearward end, and as can be seen in Figure 6, is only sufficiently wide from back to front to receive one bobbin rail 35$^a$. The carriage proper 31 in this case slides on an intermediate carriage 31$^a$ which has a ridge 36$^b$ only at its rear end and in its turn slides on the fixed slide 40. The intermediate carriage 31$^a$ has no rack teeth but the teeth 32 on the carriage proper 31 are engaged in turn by two pinions 33$^a$, 33$^b$, fixed on shafts 34$^a$ and 34$^b$ geared together. The intermediate carriage 31$^a$ has a cross-bar 50$^a$ at its front end and another cross-bar 50$^b$ at its rear end in such positions as to engage with the front and rear of the carriage proper 31 so that the latter, when operated by the pinions 33$^a$ and 33$^b$, can move with lost motion on the intermediate carriage 31$^a$, but which, upon continued operation of the pinions 33$^a$ and 33$^b$, is pushed and partakes of the motion of the carriage 31 due to the impact between this carriage and the cross-bar 50$^a$ or 50$^b$ respectively.

The lifter mechanism L is arranged in the same position and of similar construction to that shown in Figures 1 to 4 and does not need further detailed description.

In this case, when the bobbins are in the position for doffing, as shown in Figure 6, the rail 35$^a$ on which they are supported lies in the recess in the carriage proper 31 which is at the forward end of the intermediate carriage 31$^a$ and therefore overhangs the fixed slide 40. The filled bobbins 47$^a$ are replaced by empty ones, the operator racks the carriage proper back by turning the shaft 34$^a$ or 34$^b$, and first of all the carriage with the bobbins 47$^a$ reaches the position immediately below the spinning position. Then the lost motion of the carriage 31 relatively to the intermediate carriage 31$^a$ is taken up, and on further racking backwards of the carriage 31 the latter bears against the rear cross-bar 50$^b$ of the intermediate carriage 31$^a$ and consequently carries the intermediate carriage backwards with it until the bobbin rail 35$^a$ reaches the rearward position shown in Figure 8. Then the independent lifting mechanism is operated by rotating the shaft 49 and cam 45, lifting the rail 35$^a$ with the bobbins 47$^a$ clear of the ledges 36$^a$ and 36$^c$, and the carriage proper 31 is then racked forwardly until it again arrives immediately below the spinning position. During this last movement the intermediate carriage 31$^a$ has not moved owing to the lost motion. Now the rail 35$^a$ carrying the empty bobbins 47$^a$ is lowered into the recess on to the surface of the intermediate carriage 31$^a$. At the end of the spinning operation, when the bobbins 47$^b$ are full, the rail 35$^b$ carrying the filled bobbins is lowered into the recess in the carriage proper 31 between the ledges 36$^a$ and 36$^c$, and the parts have then reached the position shown in Figure 10. Then the carriage proper 31 is rocked into the forward position, and owing to its contact with the forward cross-bar 50$^a$ it pushes the intermediate carriage 31$^a$ with it so that the rail of bobbins 47$^b$ which are now filled is moved into the doffing position and the rail of empty bobbins is moved into the position below the spinning position so that the latter can be raised by the lifter mechanism, and again the parts have returned to the position shown in Figure 6 so that spinning can now be proceeded with.

In the third form of doffing motion shown in Figures 11 to 14 the large amount of projection of the slide to the rear is avoided by placing the lifter mechanism L$^a$ more forwardly so that the free ends of the lifter arms 61$^a$, 61$^b$ engage below a bobbin rail when the latter is immediately below the spinning position. The general design is here somewhat varied; for example, instead of a fixed slide corresponding to the fixed slide 10 in Figures 1 to 6, a framework 71 carrying a pair of bearer rollers 72$^a$, 72$^b$ is employed, and the carriage 51, which is a simple one-piece carriage with a double recess between the ledges 56$^a$, 56$^b$ and 56$^c$, as in Figure 1, has a flat laterally projecting surface at 73 which rides on the stationary bearer rollers 72$^a$ and 72$^b$.

The method of operation of this construction is the same as of that illustrated in Figures 1 to 4 except that when the filled bobbins shown in the doffing position in Figure 11 have been replaced by empty bobbins 67ª, the latter are only moved back to the position below the spinning position as shown in Figure 12, and then are lifted by turning the shafts 69 and the cam 65. The carriage 51 is then returned to the forward position as shown in Figure 13, and the rails 55ª bearing the empty bobbins 67ª is again lowered into the rear recess between the ledges 56ᵇ and 56ᶜ when the carriage 51 with the empty bobbins is moved rearwardly by turning the shaft 54 and the pinion 53 into such a position that the front recess between the ledges 56ª and 56ᶜ is immediately below the spinning position and can receive the filled bobbins 67ᵇ by lowering these from the position shown in Figure 14 into the recess between the ledges 56ª and 56ᶜ, whereupon the filled bobbins 67ᵇ are moved into the doffing position and the parts have regained the positions shown in Figure 11.

It will be followed that in the form illustrated in Figures 11 to 14 the cycle of motions, instead of being in the form of an inverted T with a small lift at the rearward end of the horizontal limb as shown in Figure 5, consists of an inverted T with a small lift in the vertical limb of the T. This is indicated in Figure 15 where the reference letters correspond exactly to those shown in Figure 5 except that as is obvious the horizontal motion represented in Figure 5 by the arrow c, d is now broken into two, represented by the arrows e, d and f, g.

Having thus described my invention, what I claim as new and desire to secure by Letters Patent is:—

1. A doffing motion for spinning, twisting and like machines, comprising in combination a pair of interchangeable bobbin rails, a carriage adapted to move horizontally and to support said bobbin rails, a lifting mechanism for removing either of said bobbin rails from the carriage into the spinning position, and means located at least as far towards the rear of the machine as the spinning position, said means serving for temporarily lifting either of said bobbin rails from said carriage independently of said lifting mechanism.

2. A doffing motion for spinning, twisting and like machines, comprising a fixed slide-way, a carriage movable thereon, a pair of interchangeable bobbin rails adapted to be supported on said carriage, a lifting mechanism for removing either of said bobbin rails from said carriage into the spinning position, means located at least as far towards the rear of the machine as the spinning position, said means serving for temporarily lifting either of said bobbin rails from said carriage independently of the lifting mechanism, and a mechanism for traversing said carriage on said slide-way in both directions.

3. A doffing motion for spinning, twisting and like machines, comprising in combination a fixed slide-way a carriage movable thereon, a pair of interchangeable bobbin rails adapted to be supported on said carriage, a lifting mechanism for removing either of said bobbin rails from said carriage into the spinning position, and means located to the rear of the spinning position for temporarily raising either of said bobbin rails from said carriage independently of the lifting mechanism.

4. A doffing motion for spinning, twisting and like machines, comprising in combination a fixed slide-way, an intermediate carriage movable thereon, a primary carriage movable on said intermediate carriage and capable of reciprocating the latter with lost motion, a pair of interchangeable bobbin rails adapted to be supported on said carriages, a lifting mechanism arranged to remove either of said bobbin rails from said intermediate carriage into the spinning position, and means for raising temporarily either of said rails from said carriages independently of said lifting mechanism.

5. A doffing motion for spinning, twisting and like machines, comprising in combination a pair of interchangeable bobbin rails, a fixed slide-way, an intermediate carriage movable on said slide-way a primary carriage movable on said intermediate carriage with lost motion, said primary carriage being sufficiently wide to carry one of said bobbin rails only but said intermediate carriage being of substantially twice the width of said primary carriage, a mechanism for traversing said primary carriage on said intermediate carriage and for moving the latter on said slide-way with lost motion, a lifting mechanism for removing either of said bobbin rails from said intermediate carriage into the spinning postion, and means for raising either of said bobbin rails from said carriages independently of said lifting mechanism.

6. A spinning, twisting or like machine, comprising in combination a stationary framework, a plurality of flyers journalled therein, driving means for said flyers, a fixed slide-way mounted on said framework, a carriage arranged to move on said slide-way, mechanism for driving said carriage on said slide-way, a pair of interchangeable bobbin rails adapted to be supported on said carriage, a lifting mechanism for removing either of said bobbin rails from said carriage into the spinning position, and means located at least as far towards the rear of the machine as the spinning position, said means serving for raising either of said bobbin rails from said carriage independently of said lifting mechanism.

7. A doffing motion for spinning, twisting and like machines, comprising in combination a fixed slide-way, a carriage arranged to move on said slide-way and shaped with lateral ribs forming forward and rearward recesses on said carriage, a pair of interchangeable bobbin rails each of a width to be received in either of said two recesses, a lifting mechanism for removing either of said bobbin rails from said carriage into the spinning position, and means located at least as far towards the rear of the machine as the spinning position, said means serving for raising either of said bobbin rails from said carriage independently of said lifting mechanism so as to clear the ribs and to enable said carriage to move without carrying with it the lifted bobbin rail.

8. A doffing motion for spinning, twisting and like machines, comprising in combination a fixed slide-way, a carriage arranged to be movable thereon and shaped with ribs forming forward and rearward recesses on said carriage, a pair of interchangeable bobbin rails each of such a width as to be received within either of said recesses, a lifting mechanism for removing either of said bobbin rails from said carriage into the spinning position, and means located to the rear of said spinning position for raising either of said bobbin rails independently of said lifting mechanism to a height sufficient to allow the raised bobbin rail to clear said ribs and to allow of the forward movement of said carriage without coming into contact with said raised bobbin rail.

9. A doffing motion for spinning, twisting and like machines, comprising in combination a fixed slide-way, a carriage movable thereon, mechanism for moving said carriage on said slide-way, a pair of interchangeable bobbin rails adapted to be supported on said carriage, a lifting mechanism for removing either of said bobbin rails from said carriage into the spinning position, and means comprising a pivoted linkage and lifter arms for raising either of said bobbin rails from said carriage independently of said lifting mechanism, and means for rocking and thereby actuating said pivoted linkage.

10. A doffing motion for spinning, twisting and like machines, comprising in combination a fixed slide-way, a carriage movable thereon, mechanism for moving said carriage on said slide-way a pair of interchangeable bobbin rails adapted to be supported on said carriage, a lifting mechanism for removing either of said bobbin rails from said carriage into the spinning position, and means comprising a pivoted linkage and lifter arms for raising either of said bobbin rails from said carriage independently of said lifting mechanism, and means for rocking and thereby actuating said pivoted linkage, said last mentioned means being independent of the mechanism for moving said carriage.

11. A doffing motion for spinning, twisting and like machines, comprising a fixed slide-way, a compound carriage movable thereon and consisting of an intermediate carriage and a primary carriage movable with lost motion thereon, a mechanism for moving said primary carriage on said intermediate carriage with lost motion and thereby moving said intermediate carriage, a pair of interchangeable bobbin rails adapted to be supported on said compound carriage, a lifting mechanism for removing either of said bobbin rails from said compound carriage into the spinning position, a pivoted linkage with lifter arms for temporarily raising either of said bobbin rails from said compound carriage independently of said lifting mechanism, and means for operating said pivoted linkage independently of said mechanism for moving said compound carriage.

12. A doffing motion for spinning, twisting and like machines, comprising in combination a fixed slide-way, a carriage movable thereon, a pair of interchangeable bobbin rails adapted to be supported on said carriage, a lifter mechanism for removing either of said bobbin rails from said carriage into the spinning position, a parallel linkage having arms pivoted to said fixed slide-way, and a cam rotatably mounted to actuate said linkage and temporarily to raise either of said bobbin rails from said carriage independently of said lifting mechanism.

13. A doffing motion for spinning, twisting and like machines, comprising in combination a fixed slide-way, a carriage slidable thereon, a pair of interchangeable bobbin rails adapted to be supported on said carriage, a lifter mechanism for removing either of said bobbin rails from said carriage into the spinning position, a pair of arms linked together and pivoted to said slide-way in position to lie below a bobbin rail when the latter is to the rear of the spinning position, and a hand-operated cam for rocking said pivoted arms and thereby raising either of said bobbin rails from said carriage independently of said lifting mechanism.

In witness whereof I hereunto subscribe my name this 11th day of April, 1927.

JACK P. MACKIE.